Jan. 3, 1967   E. PRIESTLEY   3,295,369
AIRCRAFT TAKE-OFF SYSTEMS
Filed April 17, 1964   3 Sheets-Sheet 1
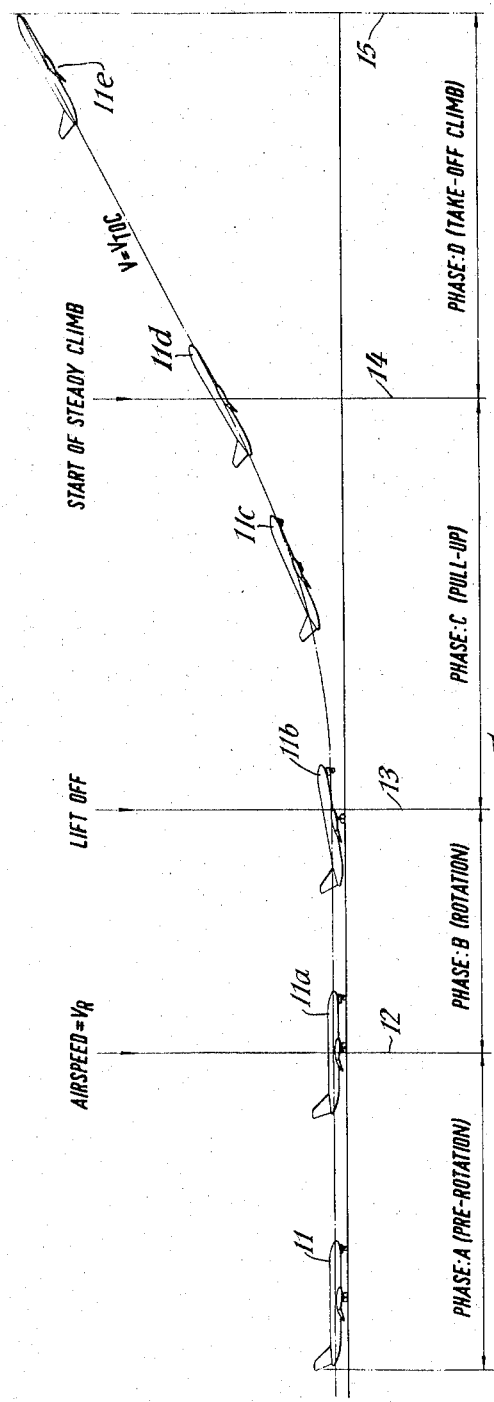
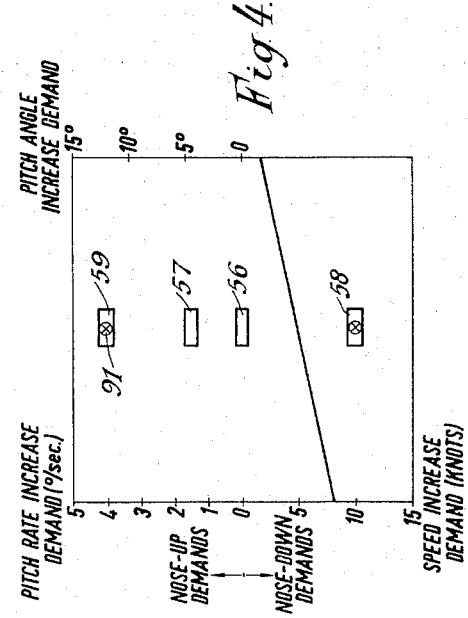
INVENTOR
ERIC PRIESTLEY
BY
ATTORNEYS

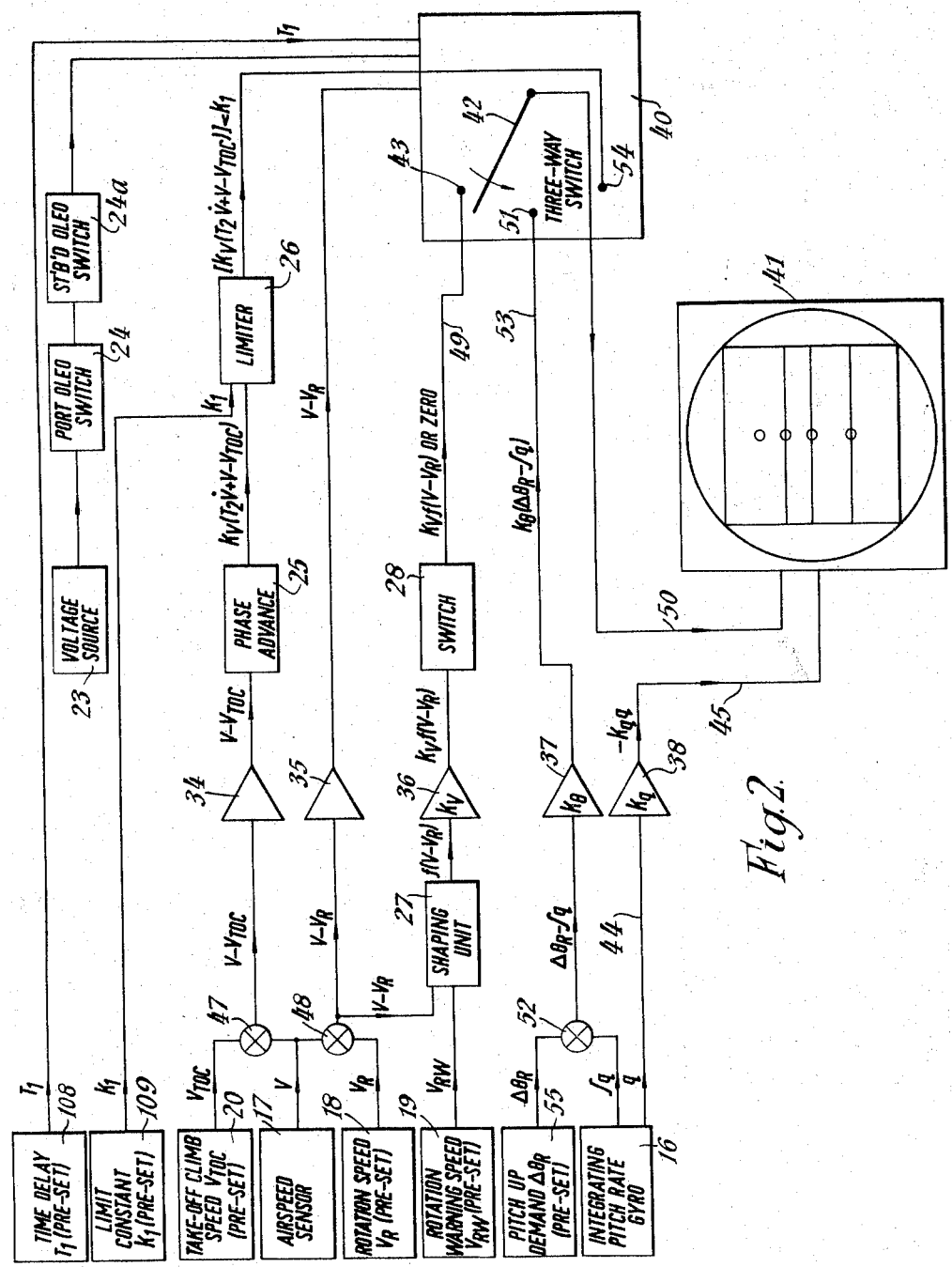

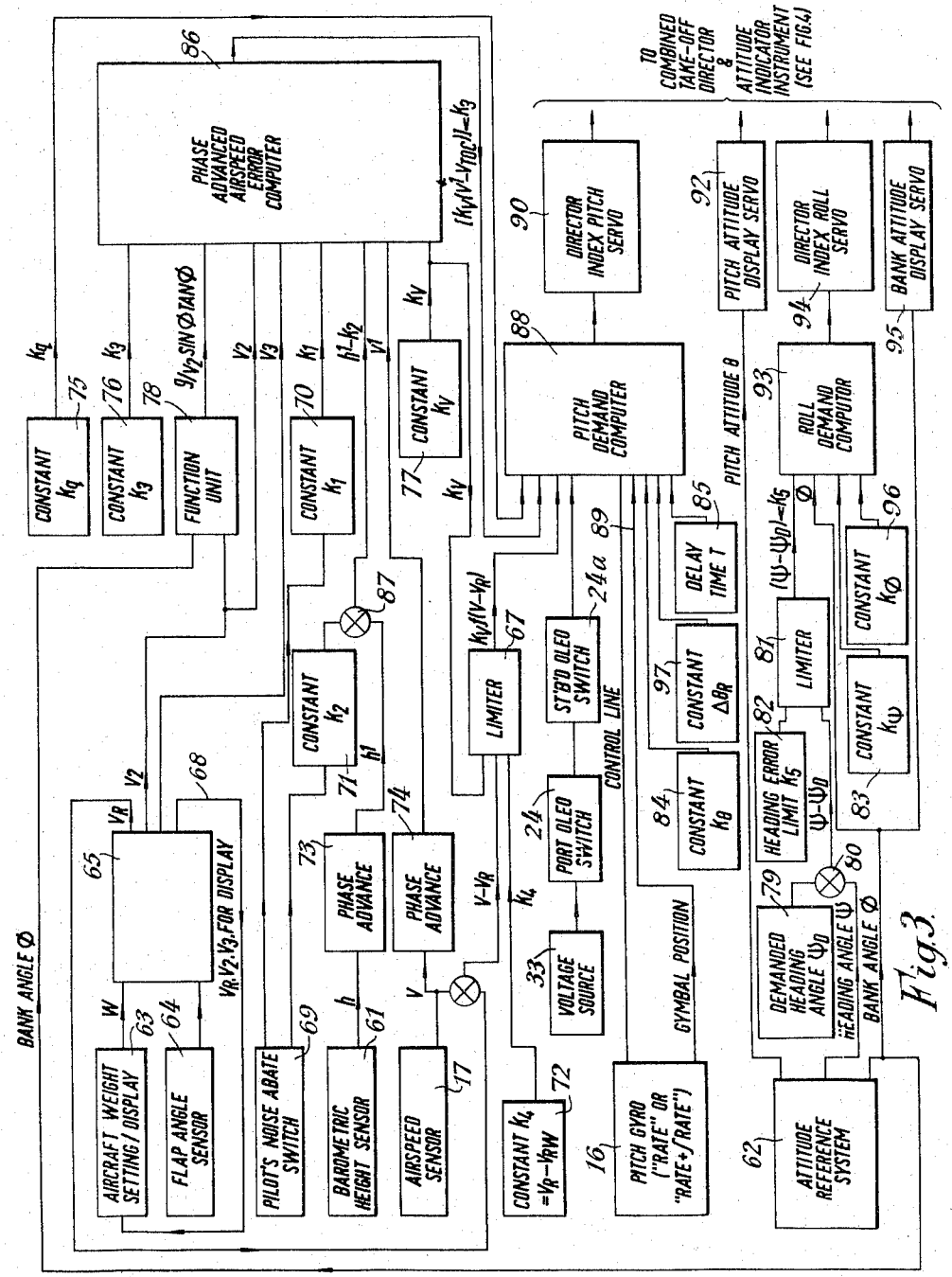

United States Patent Office 3,295,369
Patented Jan. 3, 1967

3,295,369
AIRCRAFT TAKE-OFF SYSTEMS
Eric Priestley, % Elliott Brothers (London) Limited,
St. Leonards, Hastings, Sussex, England
Filed Apr. 17, 1964, Ser. No. 360,536
Claims priority, application Great Britain, Apr. 19, 1963,
15,636/63
16 Claims. (Cl. 73—178)

This invention relates to an aircraft take-off director system for affording to the pilot of an aircraft a continuous indication of the optimal action to be taken during the period of take-off and initial climb. The director system may also be arranged to control an automatic pilot.

The task of an aircraft pilot during take-off and initial climb is to start nose-up rotation of the aircraft at an indicated airspeed $V_R$, rotate as rapidly as reasonably possible, without scraping the tail-skid on the runway and, after lift-off, i.e. becoming airborne, to pull the aircraft up quickly to attain at least screen height (35 feet) at the end of the available take-off distance, at a speed not less than the take-off safety speed, and into the take-off climb, at speed $V_{TOC}$, in a stable manner.

Possible complicating factors which may arise are as follows—

(a) the small amount of lift available for pull-up
(b) necessity to obtain adequate clearance over obstacles
(c) necessity to turn to avoid high ground
(d) existence of a degree of spiral instability throughout the take-off period
(e) reduction of flap angle at or above 400 feet
(f) occurrence of subnormal thrust, or of thrust reduction, at any time during take-off and initial climb
(g) implementation of noise abatement procedure.

The pilot's task following a decision to abort a landing is to make a safe pull-up into what is normally referred to as "approach climb."

Possible complicating factors in this case are—

(i) time lag between opening throttles and obtaining the corresponding extra thrust
(ii) necessity to reduce flap angle from approach or landing setting to take-off setting;

together with some or all of (a) to (g) above.

To assist the pilot in these complex manoeuvres an important object of the invention is to provide an aircraft take-off director system in which certain components of the aircraft's movement and position are measured, signals corresponding to the measurements are produced, further signals are generated representing constants which are characteristic of the aircraft, and the measurements signals and the constants signals are combined in order to give to the pilot continuous information as to the action to be taken at the controls in order to provide the optimal conditions of performance and safety throughout the period of take-off and initial climb.

Another object is to provide a director system in which the pilot is given a clear indication on a single indicating director instrument of the action to be taken throughout the period of take-off and initial climb.

A further object is to provide a director system which provides the pilot with all the information he needs on the behavior of the aircraft during the take-off and initial climb period.

A still further object is to provide a new director system for use by the pilot during take-off and initial climb.

Still another object is to provide a director system which may be used by the aircraft pilot and which may also be used to control an automatic pilot.

An additional object is to provide a director system by means of which the take-off and initial climb procedure may be carried out in accordance with a predetermined programme based on the characteristics of the aircraft.

Broadly, a take-off director system for aircraft according to the invention comprises means for continuously measuring selected components of the movement and position of the aircraft, means to generate signals representing constants dependent upon the characteristics of the aircraft, means to combine measurements signals with the constants signals to provide a composite demand signal representative of the action required to perform the take-off and initial climb cycle in accordance with a predetermined programme, and a director indicator instrument to display the composite signal so that the pilot, by setting the controls to carry out the demands shown by the system, can perform the required sequence of take-off control operations in a substantially optimal manner. The director display instrument may be arranged to provide a two-dimensional indication, so that spiral instability is shown and may be corrected. In case of a reduction in thrust the director indicating instrument will continue to display the optimal demand appropriate to the special circumstances.

The invention includes means associated with the main undercarriage at a selected point in the take-off procedure such that when the aircraft becomes airborne the fact is signalled by the undercarriage oleo legs becoming fully extended, and the signal is fed into the system, so that the system takes into account the fact that the aircraft has become airborne.

In addition to providing the human pilot with demand information, the director system of the invention may be used to control an automatic pilot.

Other objects will appear from the following description of two embodiments of the director system according to the invention, given by way of example, with reference to the accompanying drawings, in which—

FIGURE 1 (not to scale) shows diagrammatically the take-off and initial climb of an aircraft, broken down into four sequential phases;

FIGURE 2 is a block schematic diagram of a simple basic form of take-off director system according to the invention;

FIGURE 3 is a block schematic diagram of a more complex form of take-off director system according to the invention; and FIGURE 4 is a view of the face of the director indicating instrument.

Referring to the drawings, FIGURE 1 is a diagram showing the take-off and initial climb of an aircraft, carried out in accordance with a predetermined programme, broken down into four sequential phases, as follows:

Phase A (pre-rotation) extends from the start of the take-off ground run of the aircraft 11, up to the point indicated by reference 12, with the aircraft in the position 11a, at which the aircraft has attained an airspeed $V_R$, scheduled for the beginning of rotation.

Phase B (rotation) consists of the progressive nose-up rotation of the aircraft with the main wheels still on the runway, until lift-off occurs when the aircraft has reached the position 13 on the runway, and its attitude is as indicated at 11b.

Phase C (pull-up) after passing the point 13, the aircraft lifts off and its incidence is further increased to produce upward acceleration through the attitude indicated at 11c, at which the undercarriage is almost fully retracted, the acceleration being progressive reduced as the aircraft approaches the scheduled take-off climb speed $V_{TOC}$. At this point the aircraft has reached the point 14 and its attitude is as indicated by 11d.

Phase D (initial climb) is the substantially constant-speed climb up to a height of the order of 1500 feet, at point 15, the attitude of the aircraft being as indicated at 11e, which is the same as that shown at 11d.

In the system shown in FIGURE 2 the demands signalled to the pilot require the use of only two measuring instruments. These are an integrating pitch rate gyroscope 16 having one output $q$ and a second integrated output $\int q$, and an airspeed sensor 17 having an output V.

FIGURE 2 also shows the other units included in the system. The other units are a time delay unit 108 which provides a delay $T_1$, which is preset; a limit constant unit 109 which provides a limit constant $k_1$, which is preset; a take-off climb-speed unit 20 which provides a signal $V_{TOC}$, which is preset; a rotation speed unit 18 to provide a signal $V_R$, which is preset; a rotation warning speed unit 19 to provide a signal $V_{RW}$, which is preset; and a pitch-up demand unit 55 to provide a signal $\Delta\theta_R$, which is present.

FIGURE 2 also shows a voltage source 23 feeding switches, respectively 24 and 24a, which are open until the oleo legs become fully extended as the aircraft lifts off the ground. The switches are wired in series so that no signal is given until both legs are fully extended.

A phase advance unit 25 provides a time constant $T_2$, and other units comprise a limiter 26, a shaping unit 27 and a "Director on" switch 28.

Further units contained in the system are amplifiers, respectively 34, 35, 36, 37 and 38, and the system is completed by a three-way switch 40 for the director indicator instrument 41.

The constants previously referred to which are employed in the system according to FIGURE 2 are as follows.

$T_1$, provided by the time delay unit 108, provides a time delay, which may be of the order of two seconds from the commencement of phase B during which the closure of switches 24 and 24a will not initiate phase C. Phase B must therefore be at least $T_1$ seconds in duration.

The limit constant $k_1$ provided by the unit 109 is a limiting constant which is applied to the limiter 26 to prevent the signal from the phase advance unit 25 from exceeding a certain amplitude. The reason is that this signal acts to demand a proportional nose-up pitch rate which is required not to exceed a certain constant value during the early or any part of phase C (pull-up) lest the aircraft incidence should approach too close to the stall condition.

The take-off climb-speed signal $V_{TOC}$ provided by the unit 20 corresponds to the correct intial climb-speed.

The variable signal V provided by the airspeed measuring device 17 represents the instantaneous airspeed of the aircraft.

The constant $V_R$ provided by the unit 18 is the rotation speed which is scheduled for the particular aircraft.

The rotation warning speed signal $V_{RW}$, provided by the unit 19 is to indicate that the aircraft speed is closely approaching rotation speed.

The pitch-up demand signal $\Delta\theta_R$ provided by the unit 55 is chosen to be somewhat greater than the nose-up change of attitude which will give lift-off.

The integrating pitch rate gyroscope needs no particular description, except to mention that integrating circuitry is provided so that a rate signal $q$ and a second signal $\int q$ are available.

The shaping unit 27 is provided for the purpose of holding the director index so that it cannot move more than a prescribed amount below the indicator zero pitch position, except when the aircraft pitches nose-up at a speed less than $V_{RW}$.

The phase advance unit 25 is provided to give anticipation to the indicator index of the imminence of reaching $V_{TOC}$, thereby indicating the need to reduce acceleration in good time. It also provides damping throughout the later stages of the take-off.

FIGURE 4 shows the face of the director indicating instrument. The instrument itself may conveniently be constituted by a cathode ray tube having a calibrated scale mounted in front of the screen face. Other types of indicator may, of course, be used. As shown in FIGURE 4, the scale is of square shape. At the left-hand side of the instrument is a scale of pitch rate demand, the figures above the zero line indicating a nose-up demand scaled in degrees per second and the figures below the zero line indicating a nose-down or speed increase demand scaled in knots. The response to a nose-down demand under particular conditions, i.e., by the pilot setting his controls appropriately to put the nose of the aircraft down, will lead to an increase in speed so that a nose-down demand effectively connotes a speed increase demand. The right-hand portion of the instrument face above the zero line is calibrated in pitch angle change demand in degrees and reads from zero to 15°. The scale contains a zero marker 56, and above it is a marker 57 which indicates a pull-up pitch rate demand of 1½°/sec., which is a predetermined limit. Below the zero line 56 is a marker 58 which indicates an airspeed $V_{RW}$ which, in the example being described, is 10 knots less than $V_R$.

In operation, the cathode ray spot is made to oscillate rapidly across the instrument dial to produce a horizontal line. Where the system includes means to indicate spiral rotation of the aircraft the line will tilt to left or right as the aircraft banks to one side or the other, as illustrated, for example, by the line 60, which represents the aircraft banked about 12° to starboard.

The sequence and method of operation of the system are as follows:

(1) *Power on.*—When power is switched on, the three-way switch 40 moves to a first position in which the moving member 42 makes contact with a first contact stud 43. The integrating pitch rate gyroscope 16 is run up to speed. The signal $q$ from the gyroscope 16 is applied over a line 44 to the amplifier 38, whose gain is $k_q$. The output signal from the amplifier is $-k_q q$ and passes over a line 45 to the director indicating instrument 41. The index of the indicator is immediately centered under the action of the electrical spring of the gyroscope gimbal/rotor system. When the rotor has run up to full speed the index moves about the zero demand marker line with aircraft pitch rate.

(2) *Director on.*—Before or during taxying to the take-off starting point the director system is switched on by closing switch 28. The airspeed sensor signal V from the unit 17 and the rotation speed signal $V_R$ from the unit 18, which are combined in a differencing unit 48, produce a signal $V-V_R$ which is passed, together with the rotation warning speed signal $V_{RW}$ from the unit 19, to the shaping unit 27, producing a signal representing a function $f(V-V_R)$, which is fed to the amplifier 36. The function $f(V-V_R)$ is equal to $V-V_R$ except for $V<V_{RW}$ when the value is limited to $V_{RW}-V_R$. The amplifier 36 has a gain $k_V$ so that a signal $k_V f(V-V_R)$ is passed through the switch 28 and a line 49 to contact 43, through contact arm 42 and over a line 50 to the indicating instrument 41.

The total signal to the indicator 41 is now $$k_V f(V-V_R) - k_q q$$

The airspeed is bound to be less, at this stage, than the rotation warning speed $V_{RW}$ so that unless $q$ is smaller than $$\frac{k_v}{k_q}(V_{RW}-V_R)$$

the director index moves downwardly to the marker 58 which, with the scaling used for index displacement per unit value of speed difference $V-V_R$ or $V-V_{TOC}$, is displaced below centre by an amount corresponding to the preset value of $V_R-V_{RW}$, typically about 10 knots. The index moves about this lower marker with aircraft pitching.

*Phase A.*—As the aircraft accelerates in its take-off run, the director index still oscillates about this line due to pitching until the airspeed reaches $V_{RW}$, after which the index moves upwardly towards the centre of the indicator face at a rate proportional to the rate of increase of airspeed and reaches the centre point when $V=V_R$ at the end of the phase. Throughout this phase the demand is plainly "nose-down," with a warning of the imminence of reaching $V_R$ as soon as the airspeed exceeds $V_{RW}$. With $V_{RW}$ set at 10 knots below $V_R$, and assuming the mean acceleration between these speeds to be three knots per second, the warning time is just over three seconds.

As in "Director on" the signal to the director is $$k_V f(V-V_R) - k_q q$$

the three-way switch 40 being still in position 1.

*Phase B.*—A predetermined increase of incidence is now required and this implies an equal increase of pitch attitude when the aircraft is rolling along a substantially flat runway. Also, since the duration of rotation is only about 3 to 5 seconds, it is quite legitimate to ignore gyroscope drift which, for a typical low grade instrument in this integrating mode, would be of the order of $\frac{1}{10}°/$ second (6°/minute) or less.

As the airspeed reaches $V_R$, at point 12 in FIGURE 1, a change of sign of the $V-V_R$ signal into the three-way switch 40 causes the switch to move to position 2, in which the switch arm 42 engages a fixed contact 51.

A $\Delta\theta_R$ signal from the unit 55 is combined with the integrated signal $\int q$ from the gyroscope 16 in a differencing unit 52 and fed to the amplifier 37, which has a gain of $k_\theta$. The combined signal $k_\theta(\Delta\theta_R - \int q)$ is fed over a line 53 to the contact 51 and thence to the switch arm 42 and over line 50 to the indicator 41. This causes, in conjunction with the signal $-k_q q$, the index to be displaced from centre by an amount proportional to $$k_\theta(\Delta\theta_R - \int q) - k_q q$$

so that it flicks upwardly to demand nose-up rotation of the right amount $\Delta\theta_R$ at an initial rate $$\frac{k_\theta}{k_q}\Delta\theta_R$$

Assuming that the pilot answers this demand by pulling the aircraft nose up to centre the index, the demand shown by the index falls off, and by the time the index is again steady at the central position with the mean $q$ at zero the aircraft will have rotated stably upwards through the angle $\Delta\theta_R$.

When $V=V_R$ there is an additional operation, not indicated in FIGURE 2, whereby the integrating pitch rate gyroscope 16 is switched from the rate mode (integrating capacitor charged with voltage representing $\Delta\theta_R$ but not in spring coil circuit) to the rate$+\int$ rate mode (capacitance in series with spring coil).

The maximum director index displacement may be made to correspond to about 15° of pitch angle demand. With $k_q = 3k_\theta$ this maximum displacement will also correspond to 5°/second pitch rate demand. So, taking a typical $\Delta\theta_R$ of 12°, the index will move up to four-fifths of the maximum at the start of phase B and this is also shown as a demand for 4°/second pitch rate. During this phase the aircraft continues to accelerate. If $\Delta\theta_R$ has been correctly chosen the aircraft will leave the runway decisively but with very little vertical acceleration.

*Phase C.*—After lift-off the aircraft incidence is further increased to produce upward acceleration, in spite of the subsequent loss of lift due to reduction of ground effect, the "g" being later reduced as the speed approaches $V_{TOC}$ to give a smooth transistion to initial climb. The system is designed to demand no more than a constant chosen pitch rate, which is essential since the airspeed may be no more than about 15% to 20% above the stall speed, and some of this margin must be regarded as an assurance in respect of drop of head component of wind. Furthermore, this constant demand is held for most of the pull-up, possibly for at least 5 seconds, so that the total pull-up time is minimised.

In the example being described the phase is initiated by full extension of both port and starboard main oleo legs, which close microswitches 24 and 24a when fully extended. These microswitches are wired in series. Any temporary simultaneous oleo extensions, due to unevenness in the runway, for example, are ignored and initiation is prohibited until at least $T_1$ seconds after the commencement of the phase B, the time delay $T_1$ being provided by the signal from the unit 108. The three-way switch 40 is now moved from position 2 to position 3, in which the moving contact arm 42 engages a third fixed contact 54. Consequently, the $k_\theta(\Delta\theta_R - \int q)$ part of the phase B signal is replaced by a new signal. This is made up of the signal $V_{TOC}$, derived from the unit 20, combined with the airspeed sensor signal V from the unit 17 in a differencer unit 47 to provide a signal $V - V_{TOC}$. This is amplified in amplifier 34, phase-advanced in unit 25 to produce a resultant signal $$k_V(T_2\dot{V} + V - V_{TOC})$$

and fed to the limiter 26, which also receives the signal $k_1$ from the limit constant unit 109. The output signal from the limiter 26 is $[k_V(T_2\dot{V} + V - V_{TOC})] < k_1$. Thus the pull-up is demanded by displacing the director index upwards by an amount proportional to $$[k_V(T_2\dot{V} + V - V_{TOC})] < k_1 - k_q q$$

This will initially be positive if $q < k_1/k_q$, and will cause the index again to flick above centre, demanding an increased pitch rate. With $q$ in degrees/second and V, $V_{TOC}$ in knots, $\dot{V}$ in knots/second the pitch rate demand $$\frac{k_V}{k_q}(T_2\dot{V} + V - V_{TOC})$$

should be of the order $$2\dot{V} + \frac{1}{3}(V - V_{TOC}) \text{ i.e. } \frac{k_V}{k_q} = \frac{1}{3};\ T_2 = 6$$

This demand will be limited to some value of the order 1½°/second which in a steady pull-up (incidence constant) at a true airspeed of 120 knots gives about 0.16 g. With $\dot{V}$ of the order 2 knots/second or more the 1½°/second limiter should operate initially, notwithstanding that usually $V < V_{TOC}$ at this time, the effect being to give an upward director index displacement to the pull-up demand limit, which will be pulled by the pilot establishing a pitch rate of 1½°/second until the phase advanced speed demand signal $[k_V(T_2\dot{V} + V - V_{TOC})] < k_1$ comes off its limit. When this happens the pilot is commanded to take off the pitch rate and this should be accomplished in time governed by $T_2$, probably of order $2T_2$.

During this phase undercarriage retraction should occur.

*Phase D.*—When the undercarriage is fully retracted and the airspeed is within a preset small margin $k_2$ (say 2 or 3 knots) of $V_{TOC}$ the pitch rate signal to the director is switched off because it is likely to make the index too "lively." The three-way switch remains in position 3 but the signal to the director is now $$[k_V(T_2\dot{V} + V - V_{TOC})] < k_1$$

and nulling of this by centering the index will give stable take-off climb at airspeed $V_{TOC}$.

It will be appreciated that the phase-advanced speed mode can readily be stabilised by displacing the index laterally by an amount proportional to bank angle and requiring the pilot to centre it.

This phase extends to perhaps 1,500 feet.

It will be appreciated that the phase-advanced speed error term $T_2\dot{V} + V - V_{TOC}$, used in this and the previous phase may, in fact, be of more complex form.

*Effect of thrust loss.*—If thrust loss occurs before lift-off no discontinuities in demand occur but the pull-up will automatically be of shorter duration and the initial climb will be at a flatter angle. If the loss occurs very soon after lift-off there may again be no obvious change in the time pattern of demand. Later losses will result in a downward movement of the index in sympathy with the reduction in V, and in the take-off climb the resulting pilot's action of pushing the "stick" forward to centre the index will check the reduction in airspeed which might otherwise occur. It will be appreciated that provision for varying $V_{TOC}$ if a thrust loss occurs may readily be made by means of thrust sensors and logical units.

FIGURE 3 shows a more complex system which takes into account additional components of the aircraft's position and attitude and certain additional constants, all of which are desirable in a system intended for a large aircraft. In addition to the pitch rate gyroscope 16 providing the $q$ and $\int q$ signals and the airspeed sensor 17 to provide the signal V, there is a barometric height sensor 61 having an output $h$ and an attitude reference system 62 (which also includes gyroscopes) having outputs $\psi$ (azimuth or heading angle) $\theta$ (pitch angle) and $\phi$ (bank angle). The attitude reference system is normally fitted in the aircraft in any case, and is made use of in the system according to the invention.

A unit 63 is provided by which the pilot can set in the actual all-up weight of the aircraft at the beginning of the trip. This provides a signal W. A further unit is a flap angle sensor unit 64 which provides a signal corresponding to the actual setting of the flaps. In the simpler system of FIGURE 2, previously described, the flap angle was assumed to be constant. In the present system, however, account is taken of flap angle variation. This signal is combined with the signal representing the all-up weight of the aircraft in a further unit 65 which may comprise a two- and/or three-dimensional cam arrangement or its electronic equivalent. The unit 65 provides the signal $V_R$, which is fed to a differencing unit 66 where it is combined with the signal V from the airspeed sensor 17 to provide the signal $V-V_R$ which is fed to a limiter 67 and will be referred to more particularly later. The unit 65 also provides signals over lines 68 to the unit 63 which includes means to display signals corresponding to $V_R$, $V_2$ and $V_3$, the latter two of which will be explained later.

A unit 69 contains the pilot's noise-abate switch for the purpose of reducing the engine speed to keep the aircraft's noise within acceptable limits. When this switch is closed the unit 69 changes the values of a constant signal $k_1$ supplied by a unit 70, and a further constant signal $k_2$ supplied by a unit 71.

A unit 72 provides a constant $k_4$ which is equal to $V_R - V_{RW}$, the constant $k_4$ being also applied to the limiter 67.

Two phase-advance units, respectively 73 and 74, receive the $h$ signal from the barometric height sensor and the signal V from the airspeed sensor 17 and deliver respective signals $h'$ and $V'$. The action of the unit 73 is substantially equivalent to differentiating and smoothing the signal $h$, which is akin to a rate signal. To the extent that $h'$ is greater than $k_2$, $V_{TOC}$ is made greater than $V_2$, but with an upper limit at $V_3$. The object is to ensure that the take-off path never falls below the scheduled take-off net climb path.

Further adjustments are provided respectively by units 75, 84 and 77 at $kq$, $k_\theta$ and $k_V$. These are adjustments of overall gain in various parts of the system. The adjustment of $kq$ sets the sensitivity of the system to pitch rate changes and enables the amplitude of the pitch rate signals to be adjusted to match the indicator scale. $k_V$ sets the sensitivity to changes in airspeed, specifically $V'$, while $k_\theta$ sets the sensitivity to changes in pitch angle.

The function unit 78 receives a bank angle signal $\phi$ from the attitude reference system 62 and also receives the signal $V_2$ from the unit 65. The signal $V_2$ is the take-off safety speed below which the aircraft is not permitted to climb, being variable with all-up weight etc., and is determined for specific conditions by the system.

The attitude reference system 62 provides the pitch attitude signal $\theta$, the heading angle signal $\psi$ and the bank angle signal $\phi$ already referred to. The unit 79 provides a demanded heading angle signal $\psi_D$ which is combined with the heading angle signal $\psi$ in a differencing unit 80 to provide an output $\psi - \psi_D$ which is applied to a limiter 81. The limiter 81 is controlled by a heading error limit signal $k_5$ provided by a heading error limit unit 82. The purpose of limiting the signal $\psi - \psi_D$ is to limit the bank angle demand, however great is the required change of heading. The maximum bank angle is laid down for all aircraft.

The constant $k_3$, provided by a unit 76, will be referred to in detail later.

A further unit 83 provides an adjustment $$k_\psi$$

which governs the lateral sensitivity of the indicator index.

As in the system of FIGURE 2, a voltage source 33 is provided, together with the port and starboard oleo leg switches 24 and 24a, connected in series and closed when the respective legs become fully extended.

The constant $\Delta\theta_R$ is a signal representing an amount of nose-up rotation somewhat greater than the minimum value which will produce lift-off.

A time delay unit 85 provides a time delay signal T, the purpose of which is the same as the delay $T_1$ of FIGURE 2.

The constant $k_3$ from the unit 76 is fed to a phase advanced airspeed error computer 86, together with the signal from the function unit 78, representing $g/V \sin \phi$, $\tan \phi$, the $V_2$ and $V_3$ signals from the unit 65, and the constant $k_1$ from the unit 70. The constant $k_2$ from the unit 72 is combined with the signal $h'$ from the phase advance unit 73 in a differencing unit 87 and the resulting signal $h'-k_2$ is also fed to the unit 86, together with the signal $V'$ from the unit 74 and the constant $k_V$. The output from the unit 86, which is in the form $$[k_V(V'-V_{TOC})]<k_3$$

together with the constant $k_q$ from the unit 75, is fed to a pitch demand computer 88, which also receives the rate or rate $+ \int$ rate signal from the gyroscope 16 over a line 89 together with the constants $k_\theta$ and $\Delta\theta_R$ and the time delay signal T from the unit 85. Operation of the computer 88 in phase C is initiated by the signal from the switches 24 and 24a when both oleo legs become fully extended, subject to the time delay T from the start of phase B as in the case of the FIGURE 2 embodiment. The output of the computer 88 is fed to a director index pitch servo 90 and the output of the latter unit is used to actuate the director indicator index 91, shown in FIGURE 4. The signal from the gyroscope 16 is changed from the rate to the rate $+ \int$ rate form by a control signal from the pitch demand computer 88 applied to the gyroscope over a line marked "control line."

The pitch attitude signal $\theta$ is applied to a pitch attitude display servo unit 92 which in turn feeds the indicator instrument of FIGURE 4.

The signal $(\psi - \psi_D) < k_5$ from the limiter 81 is applied to a roll demand computer 93, which also receives the bank angle signal $\phi$ from the unit 62 and the constant signal $$k_\psi, k_\phi$$

from the units 83 and 96 and feeds a director index-roll servo 94, the output of which is also applied to the indicator instrument of FIGURE 4.

The bank angle signal $\phi$ is also applied to a bank attitude display servo 95 the output of which is also applied to the indicator instrument of FIGURE 4.

The sequence and method of operation of the system are described below, and in order to promote a ready understanding of the description, the switching modes of the pitch demand computer and the form of output signal to the indicator instrument for the different phases are given in tabular form.

TABLE

| Phase of Take-off | Conditions for Phase Engagement | Pitch Gyro Mode | Output of Pitch Demand Computer |
|---|---|---|---|
| None Engaged | Power on | Rate | $-k_q q$ (when gyro rotor has run up). |
| A (Pre-Rotation) | Power on, Director on, $V<V_R$ | Rate | $k_V f(V-V_R)-k_q q$. |
| B (Rotation) | Power on, Director on, $V>V_R$ | Rate+$\int$Rate | $k_\theta (\Delta\theta_R - \int q\, dt) - k_q q$. |
| C (Pull-up) and D (Initial Climb). | Power on, Director on, Both Main U/C Oleos Fully Extended and at least Time T after Phase B Engaged. | Rate | $k_V (V'-V_{TOC}) < k_3 - k_q q$. |

*Power on.*—When power is switched on the pitch demand computer passes the gyro rate signal to the director and the index immediately centres under the action of the electrical spring on the gyro gimbal/rotor system. When the rotor has "run up," the index will move about the zero demand marker with aircraft pitch rate, the upward displacement being $-k_q q$.

*Director on.*—Before or during taxying to the take-off starting point the director system is switched on, as in the case of the embodiment of FIGURE 2, whereupon the pitch demand computer passes the $k_V f(V-V_R)$ signal through to the director, making the total signal to the director now $k_V f(V-V_R)-k_q q$, where the function $f(V-V_R)$ is equal to $V-V_R$ except for $V<V_{RW}$ when the value is limited to $V_{RW}-V_R$, the limit being imposed by the constant $k_4$. The index is displaced downwardly by an amount corresponding to the preset value of $V_R-V_{RW}$, to the marker 58.

*Phase A.*—This phase, and the events and conditions associated therewith, are identical with those described in relation to the embodiment of FIGURE 2, and no further description is deemed necessary.

As in "Director on" the signal to the director is $k_V f(V-V_R)-k_q q$.

*Phase B.*—A rapid and chosen increase of incidence is now required.

As the airspeed reaches $V_R$ the change of sign of the $f(V-V_R)$ signal into the pitch demand computer simultaneously switches out this signal and switches the gyroscope 16 from the rate to the rate $+\int$ rate mode so that the index, now displaced from centre by an amount proportional to $k_\theta(\Delta\theta_R - \int q)-k_q q$, flicks up to demand nose-up rotation of amount $\theta_R$ at an initial rate $$\frac{k_\theta}{k_q} \Delta\theta_R$$

This pitch rate demand then falls off and by the time the index is steady at centre with the mean pitch rate zero the aircraft will have rotated up stably through the angle $\Delta\theta_R$. The value of $\Delta\theta_R$ is, as previously stated, chosen somewhat greater than the value which will give lift-off, with the object of obtaining lift-off with a pitch rate slightly less than that required in the early part of the pull-up, with the proviso that the pitch rate at lift-off must not be so great as to result in the aircraft tail-skid touching the runway.

The maximum director index displacement may be made to correspond to about 15° of pitch angle demand. With $k_q = 3k_\theta$ this maximum displacement will also correspond to 5°/second pitch rate demand. So, taking a typical $\Delta\theta_R$ of 12°, the index 91 will initially move four-fifths of the distance to the top of the scale at the start of Phase B onto the marker 59 shown in FIGURE 4 and this may also be considered as a demand for a 4°/second pitch rate. During this phase the aircraft continues to accelerate and if $\Delta\theta_R$ has been correctly chosen the aircraft will leave the runway with an optimal nose-up pitch rate of about 1 to 1½°/second, which is slightly less than that required in the first part of the pull-up.

*Phase C.*—As described in relation to FIGURE 2, the aircraft incidence is now further increased to produce upward acceleration.

The phase is initiated by full extension of both port and starboard main oleo legs closing microswitches, initiation being however prohibited until at least time T after the start of phase B; T will be of order 2 seconds. The pitch demand computer switches the pitch gyroscope back from the rate $+\int$ rate to the rate mode and passes the signal $[k_V(V'-V_{TOC})] < k_3$ through to the indicator.

The pull-up is thus demanded by displacing the indicator index upwards by an amount proportional to $[k_V(V'-V_{TOC})] < k_3 - k_q q$. The initial pitch rate demand is normally $k_3/k_q$ and is limited to some value of order 1½°/second which, in a steady pull-up (incidence constant) at a true airspeed of 120 knots, gives about ⅙ g. The limiting value is determined by the constant $k_3$. When the phase-advanced speed demand signal $$k_V(V'-V_{TOC})$$

later comes off its limit $k_3$ the pilot is directed to take off the pitch rate and this should be accomplished in time governed by the time constant of phase-advance of $V'$. Since this pitch rate of 1½°/second is only slightly greater than the designed-for value at lift-off the index should initially move slightly above centre, by an amount proportional to $k_3 - k_q q$. The index should be central, or nearly so, at the end of phase B, hence it will be expected to make an insignificant movement (probably upwards) on engagement of phase C. Thus, although the control laws in phase B and phase C differ considerably this should not be apparent to the pilot, who will rotate to lift-off and pull-up into the initial climb as a single manoeuvre.

*Phase D.*—Although no switching action occurs in the computer after initiation of phase C, this initial climb phase begins when the airspeed is within some small margin (say 2 or 3 knots) of $V_{TOC}$ (by which time the undercarriage should be substantially retracted) and continues to the start of the en-route climb at, perhaps, 1,500 feet height.

The normal objective is to hold the airspeed at the value $V_3$, which typically exceeds $V_2$ by at least 10 knots, and possibly 30 or 40 knots or more but if, abnormally, the value of $h'$ is below a certain value $k_2$ then the demanded speed is reduced by an amount proportional by the preset constant $k_1$ to this deficit but with a lower limit of $V_2$ when $h' \leq$ the preset constant value $k_2$. In special circumstances, such as lack of power or deficient performance, the available power should be used for climbing rather than accelerating. Although $h'$ may differ somewhat from rate of climb $h$ it may be said that for nearly constant climb rate the two quantities will differ little and that the value $k_2$ is closely related to the climb rate appropriate to airspeed $V_2$ in the scheduled take-off net climb path.

The value of the take-off climb speed defined in this way has been denoted by $V_{TOC}$ and varies between the limits $V_2$ and $V_3$:

$$V_{TOC} = \{V_2 + [k_1 h' - k_2)] > 0\} < V_3$$

the total signal to the director being $$k_V(V'-V_{TOC}) < k_3 - k_q q$$

as in phase C.

The speeds $V_2$ and $V_3$ are in the nature of variable constants to the extent that they are generated as functions of both aircraft weight and flap angle, the former being set in by the pilot and the latter sensed automatically, as explained previously. The flap angle is sometimes reduced quite soon after take-off (but not below 400 feet under present civil aircraft regulations) and the value of $V_{TOC}$ will then usually increase as the flaps are retracting, due to the consequent increases in $V_2$ and $V_3$; these increases will, however, be small, of the order 5 knots. The director index will move appropriately to demand $V_{TOC}$ at every instant, allowing also for the effects of flap angle change on V' and h' and of any trim change at constant stick position and airspeed.

The system operation in take-off and in initial climb with wings level has been described without consideration of either thrust loss or application of noise abatement procedures. Nor has the way in which the system directs the pilot to carry out baulked landing procedure been considered. The operation of the system under these conditions will now be described. Lateral control of the aircraft will not be specifically described since this is already well known.

Effect of thrust loss

The system is designed to give optimal or near-optimal short and long term performance in this important, though rare, eventuality.

Thrust loss during rotation or just after lift-off will have no immediate effect on the indicator though the pull-up will be of shorter duration because the term $k_V(V'-V_{TOC})$ will come off its limit $k_3$ sooner due to the reduction of V' in spite of the possible reduction in $V_{TOC}$.

Later thrust loss may result in a more or less rapid downward movement of the director index and the answering pilot's forward stick movement will check the reduction in airspeed which might otherwise occur.

The steady climb will be at a flatter angle than normal and usually at a lower airspeed, possibly as low as $V_2$, but exceeding $V_2$ if the climb rate is sufficiently high despite the subnormal thrust.

Noise abatement

Since noise abatement procedure must sometimes be followed it is necessary to make provision for changing one or more constants of the system, for example $k_1$ and/or $k_2$, as above described, via the pilot-operated "noise-abate" switch 69 which will be operated in sympathy with the thrust reduction.

Baulked landing

If on the landing approach the estimated aircraft weight is set up in the director system then, with power on and director on and undercarriage down the system will be operating in phase C (pull-up) since the airspeed will surely exceed the $V_R$ appropriate to this weight. The speed demand $V_{TOC}$ will, because of the negative h', be equal to $V_2$.

The pilot initiates overshoot procedure by opening all throttles, fully retracting the undercarriage and calling up take-off flap (not necessarily in this order). It is also necessary to disengage the autopilot if in operation. The indicator index will certainly then demand the limited pitch rate (typically 1½°/second) used in the pull-up at take-off because the aircraft is accelerating from an airspeed higher than the demanded airspeed.

Soon after establishing a climb rate the demanded airspeed $V_{TOC}$ may increase from $V_2$ towards $V_3$ which may reduce or even eliminate the speed drop otherwise necessary to get to $V_{TOC}$.

Extra pitch rate demand in turns

Neglecting the effect of climb angle, which is small for the type of aircraft likely to use the system, the extra pitch rate demand in radians/second is $g/V_T \sin \phi \tan \phi$, where $V_T$ is the true airspeed. This is shown in FIGURE 4 approximated by $g/V_2 \sin \phi \tan \phi$ where $V_2$ is C.A.S. (corrected airspeed) or possibly I.A.S. (indicated airspeed).

Due to this the pitch signal to the director, in phases C and D, i.e., when airborne, is $$[k_V(V'-V_{TOC})] < k_3 - k_q q$$

where now $$V_{TOC} = \left[ V_2 + \left\{ k_1(h'-k_2) - \frac{k_a}{k_V} \frac{g}{V_2} \sin \phi \tan \phi \right\} > 0 \right] < V_3$$

Two embodiments of the invention have been covered in the foregoing description, and it will be clear that modifications of these embodiments, or other embodiments, may be devised within the scope of the invention as defined in the appended claims.

What I claim is:

1. A take-off director system for aircraft comprising means for continuously measuring selected components of the movement and position of the aricraft, such means comprising a pitch rate gyroscope having a rate output and an integrated rate output, and an airspeed sensor, means to generate signals representing constants dependent upon the characteristics of the aircraft, means to combine the measurements signals with the constants signals to provide a composite demand signal representative of the action required to perform the take-off and initial climb cycle in accordance with a predetermined program, and a director indicating instrument to display the composite signal so that the pilot, by setting the controls to carry out the demands displayed by the system, can perform the required sequence of take-off control operations in a substantially optimal manner.

2. A system as claimed in claim 1 including further measuring means comprising a barometric height sensor to measure the height of the aircraft, and an attitude reference system to measure the azimuth or heading angle, the pitch angle and the bank angle of the aircraft.

3. A system as defined in claim 1 wherein the constants are—
   $k_1$ representing a nose-up pitch rate which should not be exceeded during the early part of the take-off,
   $V_R$ representing the predetermined airspeed at which rotation of the aircraft may commence,
   and $\Delta\theta_R$ representing a nose-up change in the aircraft's attitude slightly greater than that which will produce lift-off.

4. A system as claimed in claim 3 including a further constant $V_{RW}$ representing an airspeed below $V_R$ which is used in the indicating instrument to warn the pilot that the airspeed is approaching $V_R$.

5. A system as claimed in claim 4 including further constants,
   $k_3$ representing an initial pitch-rate demand
   $k_4$ representing $(V_R-V_{RW})$.

6. A system as defined in claim 1 comprising means to set in a constant representing the weight of the aircraft at the commencement of a flight.

7. A system as defined in claim 1 wherein the indicator instrument comprises an index which is moved upwardly from a zero position to indicate a demand for nose-up pitch rate of the aircraft and downwardly to indicate a demand for nose-down pitch rate.

8. A system as claimed in claim 7 comprising means to cause lateral movement of the index to demand correction of spiral instability.

9. A system as defined in claim 1 wherein the predetermined programme comprises a first phase, being the initial take-off run of the aircraft up to the rotation speed, the signal applied to the indicator instrument including a function $f(V-V_R)$, the phase ending when the airspeed is equal to the rotation speed.

10. A system as claimed in claim 9 comprising automatic switching means which change the signal applied to the indicator when the airspeed becomes equal to the rotation speed.

11. A system as claimed in claim 10 in which a second phase comprises the continued run of the aircraft up to take-off, the signal applied to the indicator showing a demand for upward rotation of the aircraft until take-off occurs.

12. A system as claimed in claim 11 comprising switch means associated with the oleo legs of the undercarriage to change the signal to a third-phase signal demanding further upward rotation and increase of speed up to the initial climb speed, comprising also time delay means to delay the application of the third-phase signal to the indicator to prevent premature initiation of the third phase resulting from temporary full extension of the oleo legs (for example, due to unevenness in the runway) until the aircraft has been lifted clear of the ground.

13. A system as claimed in claim 12 in which the time delay means is arranged to prevent initiation of the third phase until a predetermined time from the commencement of the second phase.

14. A system as defined in claim 1 comprising a noise-abate switch for use when the aircraft noise must be kept below a certain level by reducing the engine speed, and means controlled by the switch for altering the value of at least one constant, thereby altering the predetermined take-off programme.

15. Apparatus for directing the take-off of an aircraft in successive phases, said apparatus comprising, in combination, means for generating a first signal proportional to the rate of change of aircraft pitch angle and a second signal proportioned to the integral of such rate of change of aircraft pitch angle, means for generating a third signal proportional to the difference between the instantaneous velocity of the aircraft and a predetermined velocity at which the aircraft must move during the second phase, means operative during the first phase for superimposing said first and third signals to produce a first command signal, means for generating a fourth signal proportional to the difference between a signal representing a predetermined pitch angle of the aircraft and said second signal, means operative during the second phase for superimposing said first and fourth signals to produce a second command signal, means for generating a fifth signal proportional to the difference between the instantaneous velocity of the aircraft and a predetermined velocity at which the aircraft must move during the third phase, means operative during the third phase for superimposing said first and fifth signals to produce a third command signal, and a director indicating instrument for visually displaying said command signals.

16. The apparatus according to claim 15 including means operative during the fourth phase for producing a command signal which is said fifth signal.

References Cited by the Examiner

UNITED STATES PATENTS

| | | | |
|---|---|---|---|
| 3,077,110 | 2/1963 | Gold | 73—178 |
| 3,105,660 | 10/1963 | Lenefsky et al. | 244—77 |
| 3,148,540 | 9/1964 | Gold | 73—178 |
| 3,174,710 | 3/1965 | Hoekstra | 73—178 X |
| 3,200,642 | 8/1965 | Neuendorf et al. | 73—178 |

LOUIS R. PRINCE, *Primary Examiner.*

DONALD O. WOODIEL, *Assistant Examiner.*